United States Patent [19]

Takano

[11] Patent Number: 5,379,143
[45] Date of Patent: Jan. 3, 1995

[54] OPTICAL REGENERATIVE-REPEATER SYSTEM

[75] Inventor: Isamu Takano, Tokyo, Japan

[73] Assignee: NEC Corporation, Tokyo, Japan

[21] Appl. No.: 950,004

[22] Filed: Sep. 24, 1992

[30] Foreign Application Priority Data

Sep. 24, 1991 [JP] Japan .................... 3-273212

[51] Int. Cl.[6] ............................ H04B 10/16
[52] U.S. Cl. .................... 359/177; 359/174; 359/179; 359/349
[58] Field of Search ............ 359/333, 337, 345, 174, 359/176, 177, 179, 349

[56] References Cited

U.S. PATENT DOCUMENTS 4,484,144  11/1984  Nakagome .................... 359/180

FOREIGN PATENT DOCUMENTS 0247033  11/1991  Japan .................... 359/174
4245726   9/1992  Japan .................... 359/174

OTHER PUBLICATIONS

Kazuo Hackimoto, "Multigigabit-per-Second Optical Baseband Transmission System", Journal of Lightwave Technology, vol. 6, No. 11, Nov., 1988, pp. 1678-1685.

*Primary Examiner*—Leslie Pascal
*Attorney, Agent, or Firm*—Sughrue, Mion, Zinn, Macpeak & Seas

[57] ABSTRACT

An optical regenerative-repeater system according to the present invention includes an optical branch device for branching an input optical signal, a photodiode for converting an optical signal to an electric signal, a timing circuit for generating timing signal, and an optical latch circuit for latching an optical signal. A branched optical signal supplied from the optical branch device is converted to an electric signal by the photodiode. The timing circuit supplies a timing signal to the optical latch circuit in accordance with the electric signal supplied from the photodiode.

10 Claims, 4 Drawing Sheets

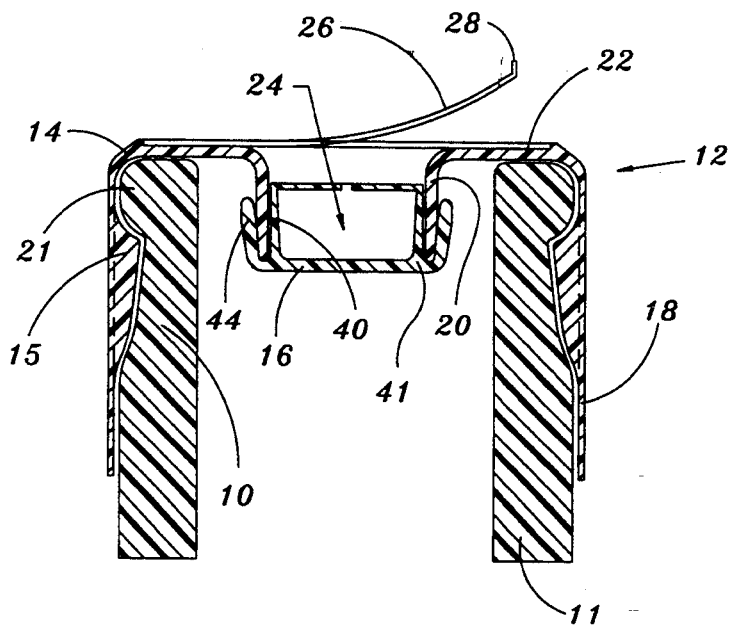
Fig. 1
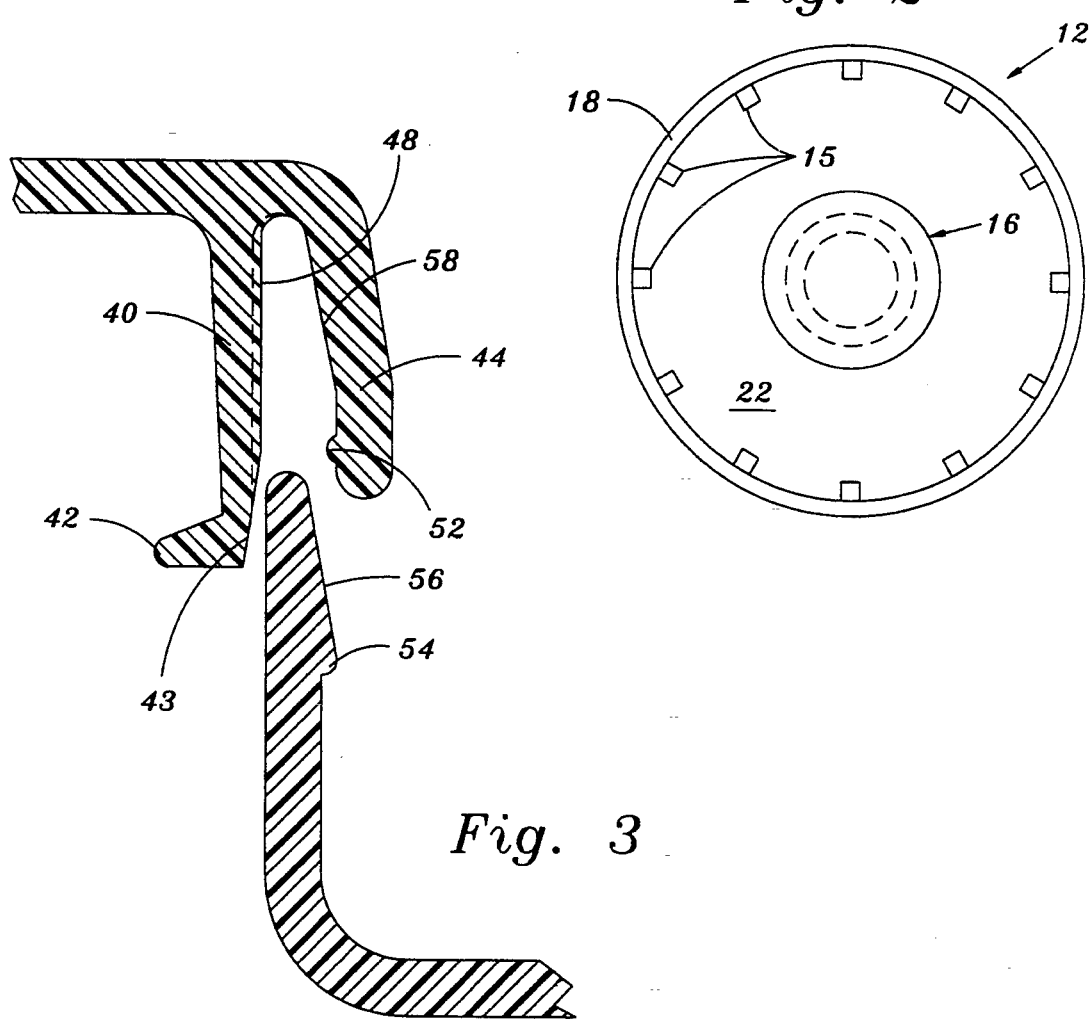
Fig. 2
Fig. 3

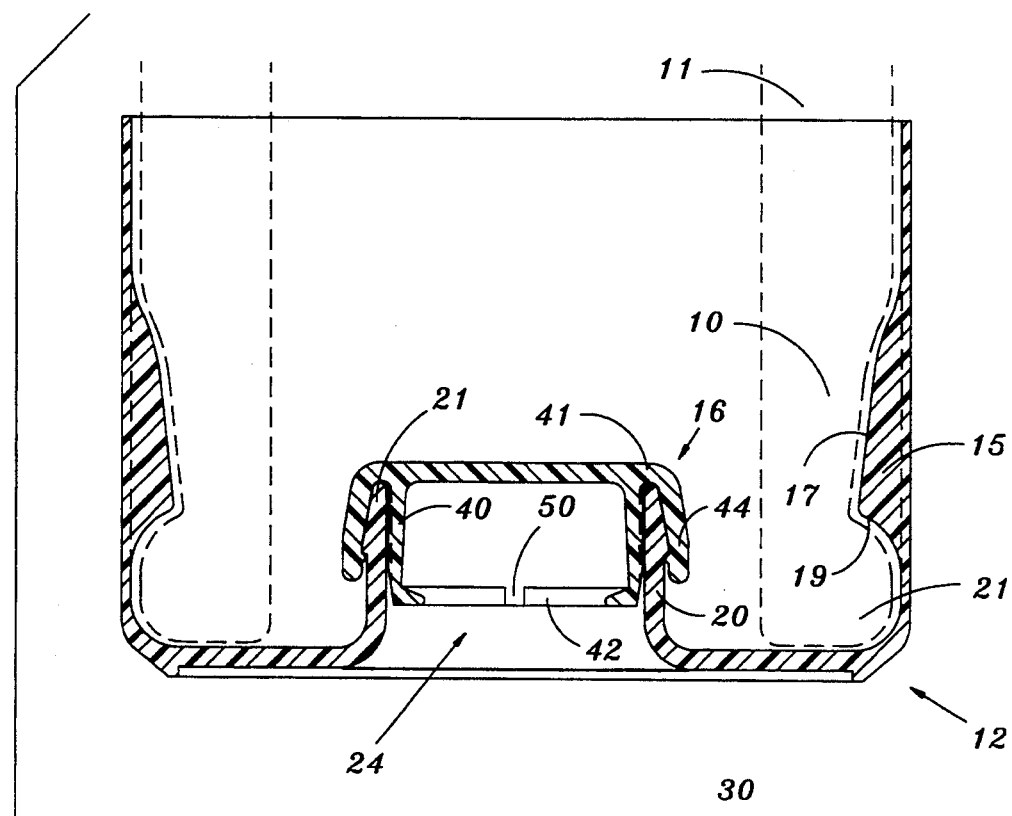
Fig. 6
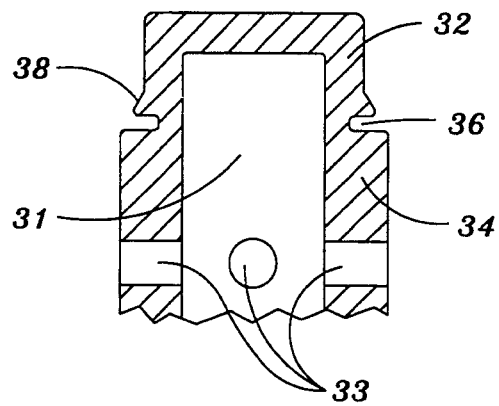
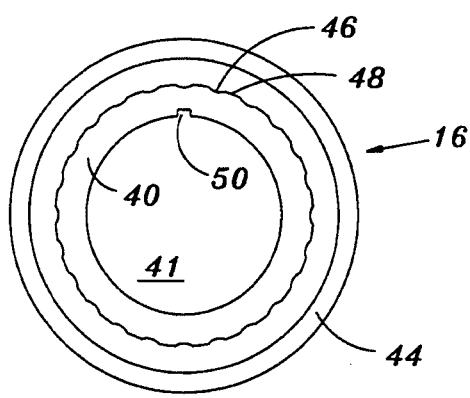
Fig. 5
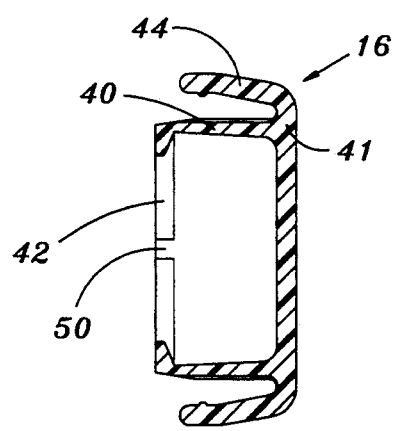
Fig. 4

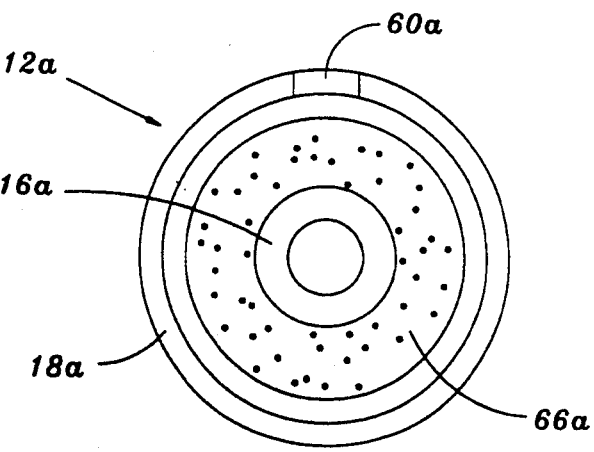
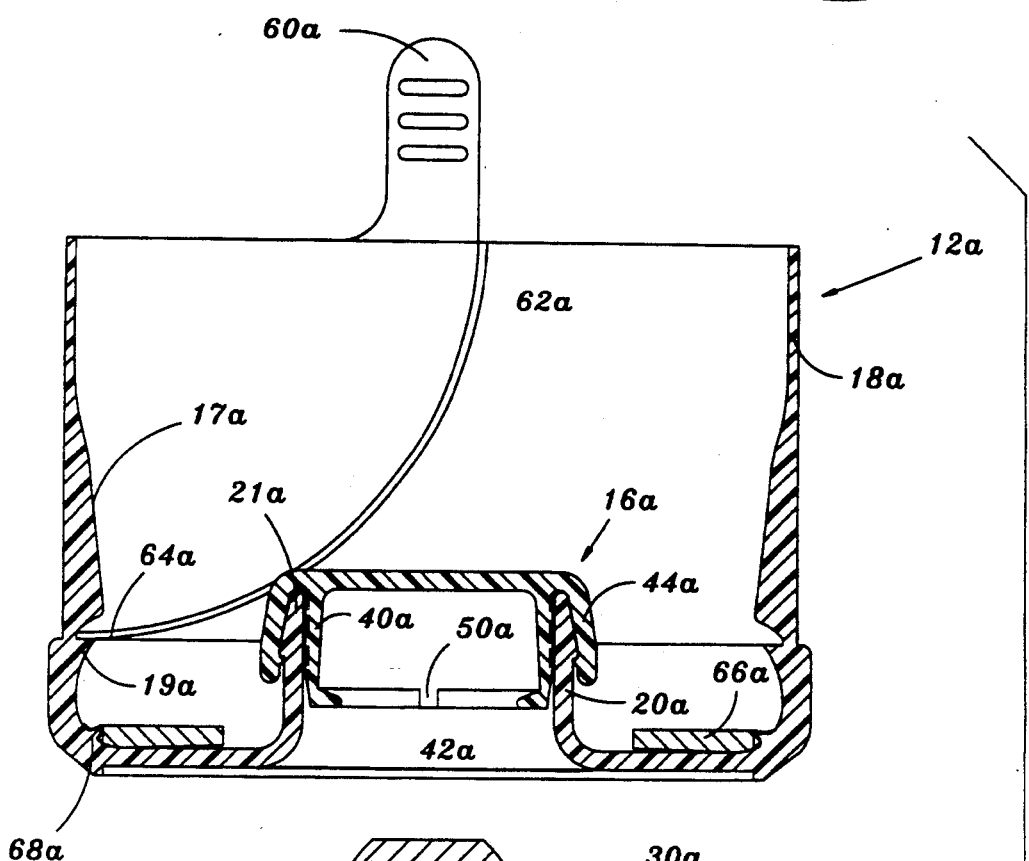
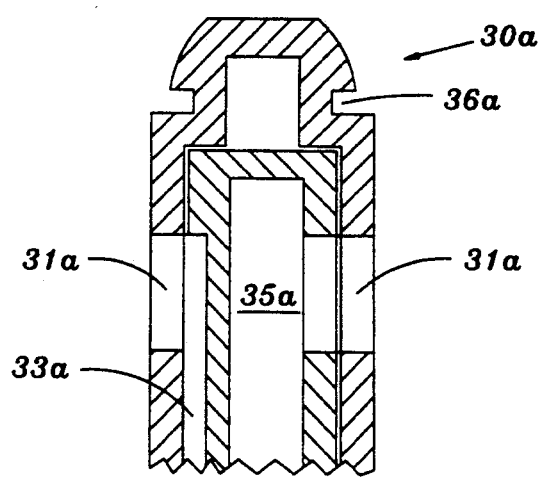

OPTICAL REGENERATIVE-REPEATER SYSTEM

FIELD OF THE INVENTION

This invention relates to an optical regenerative-repeater, and more particularly to, an optical regenerative-repeater for high speed optical communication.

BACKGROUND OF THE INVENTION

With the advance of an optical transmission technology, a superhigh speed optical transmission system using high-speed optical devices and single mode optical fibers has been proposed to realize a large capacity transmission and a long distance transmission. In this situation, an optical transmission system is required to operate with high speed and to be stable in order to realize wide-band communication in which various information of image, data and voice are transferred. That is, in such a wide-band communication network, a trank transmission system of time-division multiplexing-transmission type has a capacity of multigigabit-per-second, so that an optical transmitter and an optical receiver used for the system is required to operate with high speed and to operate in wide-band.

Recently, an optical regenerative-repeater communication system in which a signal is entirely processed optically without conversion between optical and electrical signals has been studied in order to enhance efficincy thereof.

A conventional optical regenerative-repeater includes an optical amplifier for reshaping an optical input signal by amplification, an optical timing circuit connected to the optical amplifier for extracting an optical timing signal, and an optical decision circuit connected to the optical amplifier and the optical timing circuit, respectively. The optical amplifier, the optical timing circuit and the optical decision circuit are connected by optical fibers each other, so that the optical regenerative-repeater system fully operates only by processing optical signals.

In the conventional optical regenerative-repeater system, when an input optical signal is supplied to the optical amplifier, the optical signal is amplified and supplied to the optical timing circuit and to the optical decision circuit, respectively. The optical signal is regenerated by the optical decision circuit in accordance with an optical timing signal supplied from the timing circuit.

According to the conventional optical regenerative-repeater chain system, however, there are disadvantages that in characteristics thereof are lowered as compared with a system which is partly controlled electrically, because the optical timing circuit which largely affects the characteristics of the system operates with optical signals. That is, in the conventional system, an optical timing signal supplied from the optical timing circuit is unstable due to practical properties of optical devices and stability thereof, so that timing jitter occurs in the optical timing signal and the jitter is accumulated in an output optical signal from optical repeater.

In the conventional optical regenerative-repeater system, a fixed gain is obtained. As a result, a gain is not varied dependent on the level fluctuation of optical input signals. Further, when no input signal is supplied from a fiber transmission line, noise is dominant in optical signals supplied from the optical timing circuit. As a result, noise is generated in the optical regenerative-repeater system resulting in an extraordinary state of an optical communication system.

SUMMARY OF THE INVENTION

Accordingly, it is an object of the invention to provide an optical regenerative-repeater system in which characteristics thereof can be maintained high even though the system operates optically.

It is another object of the invention to provide an optical regenerative-repeater system in which a transmission gain is variable so that an output signal level is stable.

It is another object of the invention to provide an optical regenerative-repeater system in which no noise is supplied as output even if no input signal is supplied from a transmission line.

According to the invention, an optical regenerative-repeater system, includes:

an input optical amplifier for amplifying an input optical signal;

an optical branch device for branching an output signal of the optical amplifier;

means for converting an optical signal supplied from the optical branch device to an electric signal;

means for generating a timing signal in accordance with the electric signal supplied from the converting means;

an optical latch circuit for latching an optical main signal supplied from the optical branch device in accordance with the timing signal; and an output optical amplifier for amplifying an output signal of the optical latch circuit to provide an output signal of the system.

The other objects and features of this invention will become understood from the following description with reference to the accompanying drawings.

BRIEF DESCRIPTION OF THE DRAWINGS

FIG. 1 is a block diagram showing a conventional optical regenerative-repeater system;

FIG. 2 is a block diagram showing an optical regenerative-repeater system of a first preferred embodiment according to the invention;

FIG. 3 is a block diagram showing an optical regenerative-repeater system of a second preferred embodiment according to the invention;

FIG. 4 is a block diagram showing an optical regenerative-repeater system of a third preferred embodiment according to the invention;

FIG. 5 is a block diagram showing an optical regenerative-repeater system of a fourth preferred embodiment according to the invention;

FIG. 6 is a block diagram showing an optical regenerative-repeater system of a fifth preferred embodiment according to the invention;

FIG. 7 is a block diagram showing an optical regenerative-repeater system of a sixth preferred embodiment according to the invention;

FIG. 8 is a block diagram showing an optical regenerative-repeater system of a seventh preferred embodiment according to the invention.

In these drawings, like parts are indicated by like reference numerals.

DESCRIPTION OF THE PREFERRED EMBODIMENTS

Figure 9:
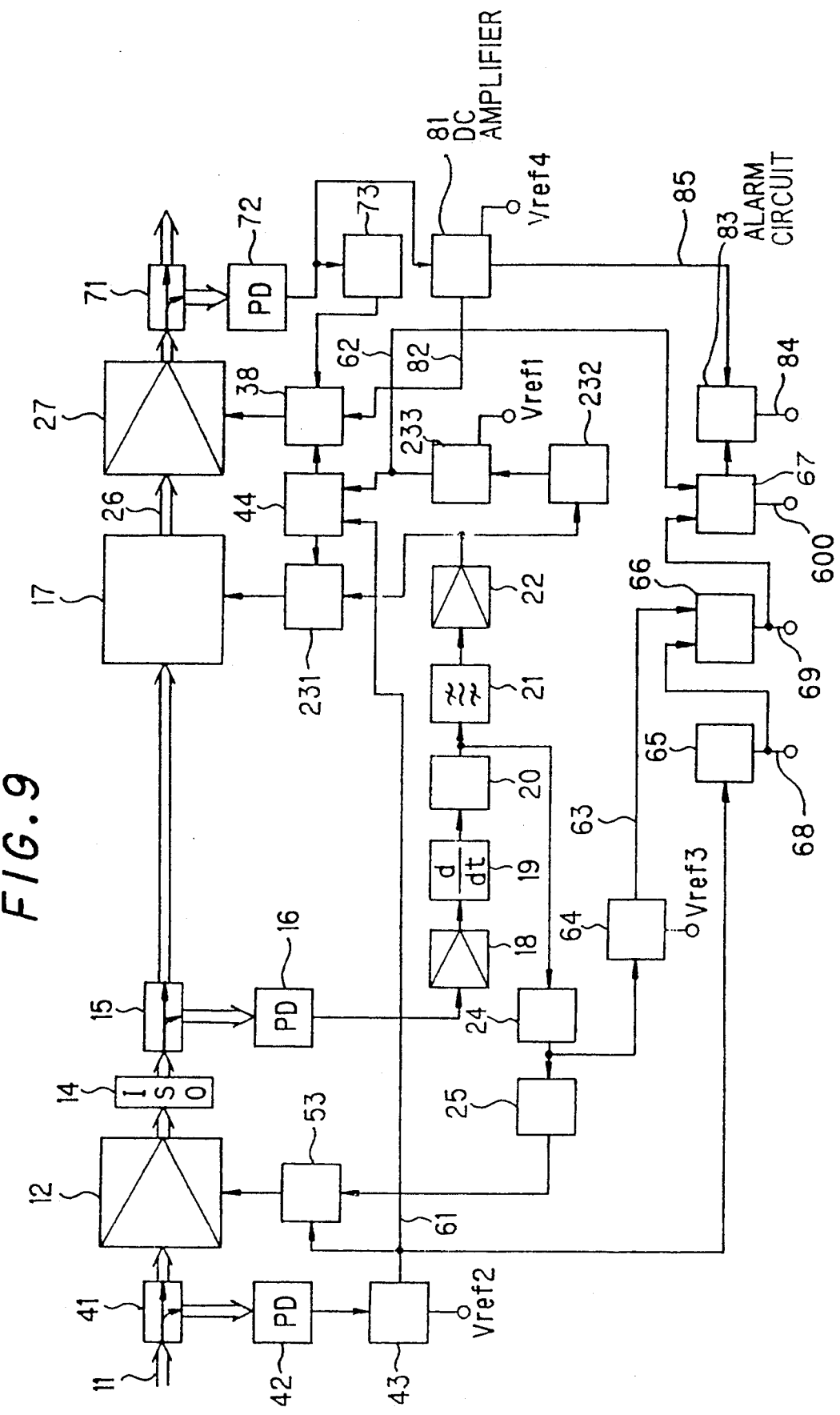
FIG. 9 is a block diagram showing an optical regenerative-repeater system of an eighth preferred embodiment according to the invention.

For better understanding the background of the present invention, the basic principle of the conventional technology is first described hereinafter with reference to FIG. 1.

FIG. 1 shows a conventional optical regenerative-repeater system which includes an optical amplifier 91 for reshaping an input signal by amplification, an optical timing circuit 92 connected at input to output of the optical amplifier 91 for generating an optical timing signal, and an optical decision circuit 93 connected at data input to output of the optical amplifier 91 and at timing signal input to output of the optical timing circuit 92, respectively. The optical amplifier 91, the optical timing circuit 92 and the optical decision circuit 93 are connected by optical fibers each other, so that the system wholly operates optically without conversion between optical and electrical signals.

In the conventional optical regenerative-repeater system, when an input optical signal is supplied to the optical amplifier 91, the signal is amplified and supplied to the optical timing circuit 92 and to the optical decision circuit 93, respectively. The optical signal is regenerated by the decision circuit 93 in accordance with a timing signal supplied from the optical timing circuit 92.

According to the conventional optical regenerative-repeater system, however, there are disadvantages in that characteristics thereof are lowered as compared with a system which is partly controlled electrically, because the optical timing circuit which largely affects the characteristics of the system operates with optical signals. That is, in the conventional system, optical timing signal supplied from the optical timing circuit is unstable due to practical properties of optical devices and stability thereof, so that timing jitter occurs in the optical timing signal and the jitter is accumulated in an optical output signal from the repeater.

In the whole optical regenerative-repeater system, a fixed gain is obtained. As a result, a gain is not varied dependent on the level fluctuation of optical input signals. Further, when no input signal is supplied from a transmission line, noise is dominant in optical signals supplied from the timing circuit. As a result, noise is generated in the optical regenerative-repeater system resulting in an extraordinary state of an optical communication system.

FIG. 2 shows an optical regenerative-repeater system of a first preferred embodiment according to the invention. The optical regenerative-repeater system includes an optical amplifier 12 connected to an input optical fiber 11, a current supply circuit 13 connected to the optical amplifier 12 for supplying injection current to the optical amplifier 12, an isolator 14 connected to the optical amplifier 11, an optical branch device 15 connected to the isolator 14 for branching a signal, a photo detector 16 connected to the optical branch device 15, an optical latch circuit 17 connected to the optical branch device 15, a wide-band amplifier 18 connected to the photo detector 16, a differentiating circuit 19 connected to the wide-band amplifier 18, a full-wave rectification circuit 20 connected to the differentiating circuit 19, a timing tank 21 connected to the full-wave rectification circuit 20, a narrow-band amplifier 22 connected to the timing tank 21, a current supply circuit 23 connected at an input to the narrow-band amplifier 22 and at an output to the optical latch circuit 17, a peak detector 24 connected at an input to an output of the full-wave rectification circuit 20, a direct current (DC) amplifier 25 connected at an input to the peak detector 24 and at an output to the current supply circuit 13, an optical amplifier 27 connected at an input to the optical latch 17 through an optical fiber 26 and at an output to an output optical fiber 29, and a current supply circuit 28 connected to the optical amplifier 27.

The narrow-band amplifier 22 is tuned to amplify a timing frequency portion of the supplied signal which is selected in the timing tank 21 to be synchoronous with a data transmission rate of a transmission line, so that output signal levels are quite different in a transmission mode and in no transmission mode.

In this system, a surface acoustic wave filter (SAW) may be used as the timing tank 21. Ideally, a specific bandwidth Q is preferably large for a timing characteristic, however, the specific bandwidth Q of about 1000 is sufficient if thermal fluctuation, practicability and the like are considered.

The detailed theory of the optical latch circuit 17 is described in a technical report "Studying of Time-division Multiplex Optical Switching System using a bistable LD" by Suzuki et al., Electronics Information and Communication Society, SE 84-62, October, 1987.

In operation, when an optical signal is supplied to the optical amplifier 12 through the optical fiber 11, the input signal is amplified optically by the optical amplifier 12 in accordance with a gain determined by the amount of injection current supplied from the current supply circuit 13. The optical amplifier 12 has a bandwidth of zero to over nine tera Hz which may not be realized by an optical receiver using APD (avalanche photo diode). That is, substantially, there is no limitation about bandwidth to the amplifier 12. The theory of the amplifier 12 is described in a technical report "Semiconductor Laser Optical Amplifier", Electronics Information and Communication Society, CS 82-24.

When an output signal of the optical amplifier 12 is supplied via the isolator 14, for removing the infulence of reflection to the amplifier 12, to the optical branch device 15, the signal is branched to two signals. An optical narrow-band filter (not shown) may be provided between the optical amplifier 12 and the isolator 14 in order to avoid reducing of S/N ratio by spontaneous emission optical noise supplied from the amplifier 12. The bandwidth of the filter is determined to be around 1 nm.

The output signals of the optical branch device 15 are supplied to the optical latch circuit 17 and the photo detector 16, respectively. The signal supplied to the photo detector 16 is converted to an electric signal, and the electric signal is supplied to the wide-band amplifier 18. The signal is amplified to be a predetermined level by the wide-band amplifier 18. At this time, when a transmission code is NRZ (non return to zero) code, no timing bright line spectrum is included in the output signal of the amplifier 18. Therefore, a timing bright line spectrum is generated by the differentiating circuit 19 and the full-wave rectification circuit 20, and the timing bright line spectrum is supplied to the timing tank 21.

The timing tank 21 supplies a timing signal having a frequency synchronized with a rate of the transmission data to the narrow-band amplifier 22. The signal is amplified to be a sufficient level by the amplifier 22, and the amplified signal is supplied to the current supply circuit 23 which is for driving the optical latch circuit 17. The optical latch circuit 17 discriminates an optical data supplied from the optical branch device 15 without any conversion to electric signal in accordance with a timing signal corresponding to the timing of current supplied from the current supply circuit 23. An output signal of the optical latch circuit 17 is supplied to the optical amplifier 27, so that an optical output signal is supplied from the optical amplifier 27 to the output optical fiber 29 in accordance with injection current supplied from the current supply circuit 28.

On the other hand, when an output signal of the full-wave rectification circuit 20 is supplied to the peak detector 24, a peak value of the signal is detected by the detector 24. When an output signal of the peak detector 24 is supplied to the DC amplifier 25, the signal is compared with a predetermined reference voltage, and a control signal having a voltage level determined in accordance with the result of the comparison is supplied to the current supply circuit 13. The current supply circuit 13 supplies a current signal of amount corresponding to the output level of the DC amplifier 25 to the optical amplifier 12, so that amplifying gain of the amplifier 12 is controlled by the current signal. Therefore, the output level is a sufficient level for a transmission signal. And, the output level of the optical amplifier 12 is stabilized at a predetermined level, that is, an AGC (automatic gain control) is carried out by the operation.

According to the first preferred embodiment, jitter in a timing signal to be supplied to the optical latch circuit 17 is reduced, because the timing signal is generated by the electric system (16 and 18 to 23), while optical transmission data is subject to no conversion to electric signal, so that jitter is not accumulated in the output signal. Therefore, characteristics of the optical regenerative-repeater system is improved.

Further, a level of the output signal is stable even if an input signal level changes, because transmission gain of the input signal is controlled at the optical amplifier 12 in accordance with a peak value of the input signal detected by the peak detector 24 using an output signal of the full-wave rectification circuit 20.

FIG. 3 shows an optical regenerative-repeater system of a second preferred embodiment according to the invention. In this embodiment, the same structure and the same operation as the first preferred embodiment shown in FIG. 2 will be omitted.

The optical regenerative-repeater system includes a current supply circuit 231 instead of the current supply circuit 23 of the first preferred embodiment, and a peak detector 232 connected to the narrow-band amplifier 22, and a DC amplifier 233 connected at an input to the peak detector 232 and at an output to the current supply circuit 231.

In operation, when a timing signal is supplied from the narrow-band amplifier 22 to the peak detector 232, peak value of the supplied signal is detected. Then, a signal of a voltage corresponding to the peak value is supplied from the peak detector 232 to the DC amplifier 233. In the DC amplifier 233, the peak voltage is compared with a reference voltage $V_{ref_1}$ corresponding to an output voltage of the peak detector 232 which is supplied thereto when no input signal is supplied to the system. At this time, when the peak voltage is equal to the reference voltage $V_{ref_1}$, an alarm signal, for instance, a TTL level signal is supplied from the DC amplifier 233 to the current supply circuit 231, so that the current supply circuit 231 supplies no signal to the optical latch circuit 17. Therefore, no driving current is supplied to the optical latch circuit 17 when no input signal is supplied to the system.

According to the second preferred embodiment, the system is prohibited from supplying useless noise, when no data signal is supplied to the system and noise signal is supplied to the system.

FIG. 4 shows an optical regenerative-repeater system of a third preferred embodiment according to the invention. The optical regenerative-repeater system is controlled more precisely in prohibiting the supply of useless noise than the second preferred embodiment. In this embodiment, the same structure and the same operation as the second preferred embodiment shown in FIG. 3 will be omitted.

The optical regenerative-repeater system includes a current supply circuit 38 instead of the current supply circuit 28 of the first preferred embodiment shown in FIG. 3. The current supply circuit 38 is connected at an input to the DC amplifier 233.

In this embodiment, an alarm signal is supplied from the DC amplifier 233 to the current supply circuit 38 in addition to the current supply circuit 231, so that no driving current is supplied from the current supply circuit 38 to the optical amplifier 27 at no input signal state. Therefore, the optical amplifier 27 is prohibited from operating.

FIG. 5 shows an optical regenerative-repeater system of a fourth preferred embodiment according to the invention. In this embodiment, the same structure and the same operation as the third preferred embodiment shown in FIG. 4 will be omitted.

In this embodiment, the optical latch circuit 17 and the optical amplifier 27 are controlled to be prohibited from supplying a signal in accordance with not only the output signal of the DC amplifier 233 but also with monitoring result of an input signal. That is, the optical regenerative-repeater system includes an optical branch device 41 connected at an input to the input optical fiber 11 and at one of outputs to the optical amplifier 12, a photo detector 42 connected to the optical branch device 41, a DC amplifier 43 connected at an input to the photo detector 42, and an AND circuit connected at inputs to the DC amplifiers 43 and 233 and at outputs to the current supply circuits 231 and 38.

In operation, when an output signal of the optical branch device 41 is supplied to the photo detector 42, a voltage signal having a level corresponding to an average of the radiant power of the optical signal input to the photo detector 42 is supplied from the photo detector 42 to the DC amplifier 43. In the DC amplifier 43, the supplied voltage is compared with a reference voltage $V_{ref_2}$ corresponding to an input signal voltage at no input signal state. And, when the input voltage is equal to the reference voltage $V_{ref_2}$, an alarm signal, for instance, a TTL level signal is supplied to the AND circuit 44. The reference voltage $V_{ref_2}$ is determined so that it can be classified from the minimum mark ratio of the optical input data.

When both of high level alarm signals are supplied from the DC amplifiers 43 and 233 to the AND circuit 44, control signals are supplied to the current supply circuits 38 and 231 to be prohibited from supplying signal. Therefore, each of the optical latch circuit 17 and the optical amplifier 27 supply no signal.

According to the fourth preferred embodiment, even though no signal is supplied to the photo detector 16 because of, for example, a trouble of the optical amplifier 12, output of the system is not affected thereby.

That is, in this case, noise is not supplied from the system as an output.

FIG. 6 shows an optical regenerative-repeater system of a fifth preferred embodiment according to the invention. In this embodiment, the same structure and the same operation as the fourth preferred embodiment shown in FIG. 5 will be omitted.

In this embodiment, the optical amplifier 12 is controlled to be prohibited from supplying a signal to the isolator 14. That is, the optical regenerative-repeater system includes a current supply circuit 53 instead of the current supply circuit 13 of the fourth preferred embodiment shown in FIG. 5. The current supply circuit 53 is connected at inputs to the DC amplifiers 43 and 25 and at an output to the optical amplifier 12.

In operation, when an alarm signal is supplied from the DC amplifier 43 to the current supply circuit 53, the current supply circuit 53 is prohibited from supplying a driving current to the optical amplifier 12.

Therefore, according to the fifth preferred embodiment, when no input data is supplied to the system, no driving current is supplied from the current supply circuit 53 to the optical amplifier 12, so that the amplifier 12 can be avoided to be broken by excess current.

FIG. 7 shows an optical regenerative-repeater system of a sixth preferred embodiment according to the invention. In this embodiment, the same structure and the same operation as the fifth preferred embodiment shown in FIG. 6 will be omitted.

The optical regenerative-repeater system has a function to monitor a trouble location. That is, the optical regenerative-repeater system includes a DC amplifier 64 connected at an input to the peak detector 24, an alarm monitor circuit 65 connected at an input to the outpost of the DC amplifier 43, an alarm monitor circuit 66 connected at inputs to outputs of the DC amplifier 64 and the alarm monitor circuit 65, an alarm monitor circuit 67 connected at inputs to outputs or the alarm monitor circuit 66 and the DC amplifier 233. The alarm monitor circuits 65 to 67 have output terminals 68, 69 and 600 each connected to an external monitor system (not shown).

In operation, when a high level alarm signal is supplied from the DC amplifier 43 to the alarm monitor circuit 65, a high level signal is supplied from the alarm monitor circuit 65 to the external monitor system and to the alarm monitor circuit 66. Each of the alarm monitor circuits 66 and 67 supplies a high level output signal, when at least one of input signals is a high level signal. That is, when high level signals are supplied from all of the alarm monitor circuits 65 to 67, it is judged that no input signal is supplied to the system (the optical amplifier 12) through the input optical fiber 11. When high level signals are supplied from only the alarm monitor circuits 66 and 67, it is judged that, though an input signal is supplied to the system, anything unusual occurs at a location of the amplifier or subsequent thereto. And, when high level signal is supplied from only the alarm monitor circuit 67, it is judged that there is anything unusual in the timing generating portion (18 to 22).

FIG. 8 shows an optical regenerative-repeater system of a seventh preferred embodiment according to the invention. In this embodiment, the same structure and the same operation as the sixth preferred embodiment shown in FIG. 7 will be omitted.

The optical regenerative-repeater system includes an optical branch device 71 connected to the optical amplifier 27, a photo detector 72 connected to the optical branch device 71, and a DC amplifier 73 connected at an input to the photo detector 72 and at an output to the current supply circuit 38.

In operation, when an output signal of the optical branch device 71 is supplied to the photo detector 72, the signal is converted to an electric signal by the photo detector 72, and the electric signal (voltage signal) is supplied to the DC amplifier 73. Then, the DC amplifier 73 supplies a control signal having a level determined in accordance with a level of the voltage signal from the photo detector 72 to the current supply circuit 38. The current supply circuit 38 supplies a current signal to the optical amplifier 27 in accordance with the control signal supplied from the DC amplifier 73, that gain of the optical amplifier 27 is controlled by feed back. Therefore, an output level of the optical regenerative-repeater system can be controlled to be stabilized.

FIG. 9 shows an optical regenerative-repeater system of an eighth preferred embodiment according to the invention. In this embodiment, the same structure and the same operation as the seventh preferred embodiment shown in FIG. 8 will be omitted.

The optical regenerative-repeater system includes a DC amplifier 81 connected at an input to the output of the photo detector 72 and at one of outputs to the current supply circuit 38, and an alarm monitor circuit 83 connected at inputs to the alarm monitor circuit 67 and to the other output of the DC amplifier 81 and at an output to an output terminal 67 which is connected to the external monitor system.

In operation, when the output signal of the photo detector 72 is supplied to the DC amplifier 81, the signal is compared with a reference voltage $Vref_4$ which corresponds to a predetermined output level of the optical amplifier 27. In this comparison, when the level of the signal from the photo detector 72 is lower than that of the reference voltage $Vref_4$, the DC amplifier 81 supplies a control signal 82 to the current supply circuit 38 to be prohibited from supplying current signal to the optical amplifier 27. At the same time, an alarm signal 85 is supplied from the DC amplifier 81 to the alarm monitor circuit 83.

When no timing signal is supplied to the optical amplifier 27 and no output signal is supplied from the optical amplifier 27, high level signals are supplied from only the alarm monitor circuits 67 and 83. When no output signal is supplied from the optical amplifier 27, high level signal is supplied from only the alarm monitor circuit 83.

Although the invention has been described with respect to specific embodiment for complete and clear disclosure, the appended claims are not to be thus limited but are to be construed as embodying all modification and alternative constructions that may occur to one skilled in the art which fairly fall within the basic teaching herein set forth.

What is claimed is:

1. An optical regenerative-repeater system, comprising:

an input optical amplifier for amplifying an input optical signal;

an optical branch device for branching an output signal of said optical amplifier;

means for converting an optical signal supplied from said optical branch device to an electric signal;

means for generating a timing signal in accordance with said electric signal supplied from said converting means;

an optical latch circuit fop latching an optical main signal supplied from said optical branch device in accordance with said timing signal; and an output optical amplifier for amplifying an output signal of said optical latch circuit to provide an output signal of said system.

2. An optical regenerative-repeater system according to claim 1, further comprising:

a driving current supply circuit for supplying said timing signal to said optical latch;

an injection current supply circuit for supplying a driving current to said input optical amplifier;

a direct current (DC) amplifier for generating a control voltage to be supplied to said injection current supply circuit;

wherein, gain of said input optical amplifier can be changed in accordance with an output current of said injection current supply circuit.

3. An optical regenerative-repeater system, comprising:

a first optical amplifier for amplifying an input optical signal;

a first injection current supply circuit for supplying a driving current to said first optical amplifier;

an optical branch device for branching a signal supplied from said first optical amplifier through an optical isolator to provide a main optical signal and a branched signal;

an optical latch for latching said main optical signal;

a photodiode for converting said branched signal to an electric signal;

a wide-band amplifier for amplifying an output signal of said photodiode;

a differentiating circuit for detecting a level change point in an output signal of said wide-band amplifier;

a full-wave rectification circuit for generating a line spectrum from an output signal of said differentiating circuit;

a timing tank for generating a first timing signal in accordance with an output signal of said full-wave rectification circuit;

a narrow-band amplifier for amplifying an output signal of said timing tank;

a first peak detector for detecting a peak value of an output signal of said narrow-band amplifier;

a first direct current (DC) amplifier for amplifying an output signal of said first peak detector to a predetermined level, comparing said amplified signal with a reference voltage, and generating an error message signal when said amplified signal is equal to said reference voltage;

a driving current supply circuit for supplying a second timing signal to said optical latch in accordance with output signals of said narrow-band amplifier and said first DC amplifier;

a second optical amplifier for amplifying an output signal of said optical latch;

a second injection current supply circuit for supplying a driving current to said second optical amplifier;

a second peak detector for detecting a peak value of said output signal of said full-wave rectification circuit; and a second direct current (DC) amplifier for generating a control voltage to be supplied to said first injection current supply circuit in accordance with an output signal of said second peak detector;

wherein, gain of said first optical amplifier can be changed in accordance with output current of said first injection current supply circuit; said driving current supply circuit is prohibited from supplying output current in accordance with an output signal of said first DC amplifier.

4. An optical regenerative-repeater system, comprising:

a first optical amplifier for amplifying an input optical signal;

a first injection current supply circuit for supplying a driving current to said first optical amplifier;

an optical branch device for branching a signal supplied from said first optical amplifier through an optical isolator to provide a main optical signal and a branched signal;

an optical latch for latching said main optical signal;

a photodiode for converting said branched signal to an electric signal;

a wide-band amplifier for amplifying an output signal of said photodiode;

a differentiating circuit for detecting a level change point in an output signal of said wide-band amplifier;

a full-wave rectification circuit for generating a line spectrum from an output signal of said differentiating circuit;

a timing tank for generating a first timing signal in accordance with an output signal of said full-wave rectification circuit;

a narrow-band amplifier for amplifying an output signal of said timing tank;

a first peak detector for detecting a peak value of an output signal of said narrow-band amplifier;

a first direct current (DC) amplifier for amplifying an output signal of said first peak detector to a predetermined level, comparing said amplified signal with a reference voltage, and generating an error message signal when said amplified signal is equal to said reference voltage;

a driving current supply circuit for supplying a second timing signal to said optical latch in accordance with output signals of said narrow-band amplifier and said first DC amplifier;

a second optical amplifier for amplifying an output signal of said optical latch;

a second injection current supply circuit for supplying a driving current to said second optical amplifier;

a second peak detector for detecting a peak value of said output signal of said full-wave rectification circuit; and a second direct current (DC) amplifier for generating a control voltage to be supplied to said first injection current supply circuit in accordance with an output signal of said second peak detector;

wherein, gain of said first optical amplifier can be changed in accordance with output current of said first injection current supply circuit; and said driving current supply circuit and said second injection current supply circuit being prohibited from supplying output current in accordance with an output signal of said first DC amplifier.

5. An optical regenerative-repeater system, comprising:
  a first optical branch device for branching an input optical signal to provide a first main optical signal and a first branched signal;
  a first optical amplifier for amplifying said first main optical signal;
  a first injection current supply circuit for supplying a driving current to said first optical amplifier;
  a second optical branch device for branching an optical signal supplied from said first optical amplifier through an optical isolator to provide a second main optical signal and a second branched signal;
  an optical latch for latching said second main optical signal;
  a first photodiode for converting said second branched signal to an electric signal;
  a wide-band amplifier for amplifying an output signal of said first photodiode;
  a differentiating circuit for detecting a level change point in an output signal of said wide-band amplifier;
  a full-wave rectification circuit for generating a line spectrum from an output signal of said differentiating circuit;
  a timing tank for generating a first timing signal in accordance with an output signal of said full-wave rectification circuit;
  a narrow-band amplifier for amplifying an output signal of said timing tank;
  a first peak detector for detecting a peak value of an output signal of said narrow-band amplifier;
  a first direct current (DC) amplifier for amplifying an output signal of said first peak detector to a predetermined level, comparing said amplified signal with a first reference voltage, and generating an error message signal when said amplified signal is equal to said first reference voltage;
  an AND circuit being supplied with an output signal of said first DC amplifier at one input terminal;
  a driving current supply circuit for supplying a second timing signal to said optical latch in accordance with output signals of said narrow-band amplifier and said AND circuit;
  a second optical amplifier for amplifying an output signal of said optical latch;
  a second injection current supply circuit for supplying a driving current to said second optical amplifier;
  a second peak detector for detecting a peak value of said output signal of said full-wave rectification circuit;
  a second direct current (DC) amplifier for generating a control voltage to be supplied to said first injection current supply circuit in accordance with an output signal of said second peak detector;
  a second photodiode which is supplied with said first branched signal; and
  a third direct current (DC) amplifier for comparing a voltage signal corresponding to an average radiant power of said first branched signal supplied to said second photodiode with a second reference voltage, and supplying an alarm signal to said AND circuit when they are equal;
  wherein, gain of said first optical amplifier can be changed in accordance with output current of said first injection current supply circuit; and of said driving current supply circuit and said second injection current supply circuit being prohibited from supplying output current in accordance with an output signal of said AND circuit.

6. An optical regenerative-repeater system, comprising:
  a first optical branch device for branching an input optical signal to provide a first main optical signal and a first branched signal;
  a first optical amplifier for amplifying said first main optical signal;
  a first injection current supply circuit for supplying a driving current to said first optical amplifier;
  a second optical branch device for branching an optical signal supplied from said first optical amplifier through an optical isolator to provide a second main optical signal and a second branched signal;
  an optical latch for latching said second main optical signal;
  a first photodiode for converting said second branched signal to an electric signal;
  a wide-band amplifier for amplifying an output signal of said first photodiode;
  a differentiating circuit for detecting a level change point in an output signal of said wide-band amplifier;
  a full-wave rectification circuit for generating a line spectrum from an output signal of said differentiating circuit;
  a timing tank for generating a first timing signal in accordance with an output signal of said full-wave rectification circuit;
  a narrow-band amplifier for amplifying an output signal of said timing tank;
  a first peak detector for detecting a peak value of an output signal of said narrow-band amplifier;
  a first direct current (DC) amplifier for amplifying an output signal of said first peak detector to a predetermined level, comparing said amplified signal with a first reference voltage, and generating an error message signal when said amplified signal is equal to said first reference voltage;
  an AND circuit being supplied with an output signal of said first DC amplifier at one input terminal;
  a driving current supply circuit for supplying a second timing signal to said optical latch in accordance with output signals of said narrow-band amplifier and said AND circuit;
  a second optical amplifier for amplifying an output signal of said optical latch;
  a second injection current supply circuit for supplying a driving current to said second optical amplifier;
  a second peak detector for detecting a peak value of said output signal of said full-wave rectification circuit;
  a second direct current (DC) amplifier for generating a control voltage to be supplied to said first injection current supply circuit in accordance with an output signal of said second peak detector;
  a second photodiode which is supplied with said first branched signal; and
  a third direct current (DC) amplifier for comparing a voltage signal corresponding to an average radiant power of said first branched signal supplied to said second photodiode with a second reference voltage, and supplying an alarm signal to said AND circuit and first injection current supply circuit when they are equal;

wherein, gain of said first optical amplifier can be changed in accordance with output current of said first injection current supply circuit; said first injection current supply circuit being prohibited from supplying output current in accordance with an output signal of said third DC amplifier; and said driving current supply circuit and said second injection current supply circuit being prohibited from supplying output current in accordance with an output signal of said AND circuit.

7. An optical regenerative-repeater system, comprising:
   a first optical branch device for branching an input optical signal to provide a first main optical signal and a first branched signal;
   a first optical amplifier for amplifying said first main optical signal;
   a first injection current supply circuit for supplying a driving current to said first optical amplifier;
   a second optical branch device for branching an optical signal supplied from said first optical amplifier through an optical isolator to provide a second main optical signal and a second branched signal;
   an optical latch for latching said second main optical signal;
   a first photodiode for converting said second branched signal to an electric signal;
   a wide-band amplifier for amplifying an output signal of said first photodiode;
   a differentiating circuit for detecting a level change point in an output signal of said wide-band amplifier;
   a full-wave rectification circuit for generating a line spectrum from an output signal of said differentiating circuit;
   a timing tank for generating a first timing signal in accordance with an output signal of said full-wave rectification circuit;
   a narrow-band amplifier for amplifying an output signal of said timing tank;
   a first peak detector for detecting a peak value of an output signal of said narrow-band amplifier;
   a first direct current (DC) amplifier for amplifying an output signal of said first peak detector to a predetermined level, comparing said amplified signal with a first reference voltage, and generating an error message signal when said amplified signal is equal to said first reference voltage;
   an AND circuit being supplied with an output signal of said first DC amplifier at one input terminal;
   a driving current supply circuit for supplying a second timing signal to said optical latch in accordance with output signals of said narrow-band amplifier and said AND circuit;
   a second optical amplifier for amplifying an output signal of said optical latch;
   a second injection current supply circuit for supplying a driving current to said second optical amplifier;
   a second peak detector for detecting a peak value of said output signal of said full-wave rectification circuit;
   a second direct current (DC) amplifier for generating a control voltage to be supplied to said first injection current supply circuit in accordance with an output signal of said second peak detector;
   a second photodiode which is supplied with said first branched signal;
   a third direct current (DC) amplifier for comparing a voltage signal corresponding to an average radiant power of said first branched signal supplied to said second photodiode with a second reference voltage, and supplying an alarm signal to said AND circuit and first injection current supply circuit when they are equal;
   a fourth direct current (DC) amplifier for comparing an output signal of said second peak detector with a third reference voltage, and generating an alarm signal when they are equal;
   a first alarm circuit which is supplied with an output signal of said third DC amplifier;
   a second alarm circuit which is supplied with output signals of said first alarm circuit and fourth DC amplifier; and
   a third alarm circuit which is supplied with output signals of said second alarm circuit and first DC amplifier;
   wherein, gain of said first optical amplifier can be changed in accordance with output current of said first injection current supply circuit; said first injection current supply circuit being prohibited from supplying output current in accordance with an output signal of said third DC amplifier; said driving current supply circuit and said second injection current supply circuit being prohibited from supplying output current in accordance with an output signal of said AND circuit, and abnormality being monitored in accordance with output signals of said first to third alarm circuits.

8. An optical regenerative-repeater system, comprising:
   a first optical branch device for branching an input optical signal to provide a first main optical signal and a first branched signal;
   a first optical amplifier for amplifying said first main optical signal;
   a first injection current supply circuit for supplying a driving current to said first optical amplifier;
   a second optical branch device for branching an optical signal supplied from said first optical amplifier through an optical isolator to provide a second main optical signal and a second branched signal;
   an optical latch for latching said second main optical signal;
   a first photodiode for converting said second branched signal to an electric signal;
   a wide-band amplifier for amplifying an output signal of said first photodiode;
   a differentiating circuit for detecting a level change point in an output signal of said wide-band amplifier;
   a full-wave rectification circuit for generating a line spectrum from an output signal of said differentiating circuit;
   a timing tank for generating a first timing signal in accordance with an output signal of said full-wave rectification circuit;
   a narrow-band amplifier for amplifying an output signal of said timing tank;
   a first peak detector for detecting a peak value of an output signal of said narrow-band amplifier;
   a first direct current (DC) amplifier for amplifying an output signal of said first peak detector to a predetermined level, comparing said amplified signal with a first reference voltage, and generating an error message signal when said amplified signal is equal to said first reference voltage;

an AND circuit being supplied with an output signal of said first DC amplifier at one input terminal;

a driving current supply circuit for supplying a second timing signal to said optical latch in accordance with output signals of said narrow-band amplifier and said AND circuit;

a second optical amplifier for amplifying an output signal of said optical latch;

a second injection current supply circuit for supplying a driving current to said second optical amplifier;

a second peak detector for detecting a peak value of said output signal of said full-wave rectification circuit;

a second direct current (DC) amplifier for generating a control voltage to be supplied to said first injection current supply circuit in accordance with an output signal of said second peak detector;

a second photodiode which is supplied with said first branched signal;

a third direct current (DC) amplifier for comparing a voltage signal corresponding to an average radiant power of said first branched signal supplied to said second photodiode with a second reference voltage, and supplying an alarm signal to said AND circuit and first injection current supply circuit when they are equal;

a fourth direct current (DC) amplifier for comparing an output signal of said second peak detector with a third reference voltage, and generating an alarm signal when they are equal;

a first alarm circuit which is supplied with an output signal of said third DC amplifier;

a second alarm circuit which is supplied with output signals of said first alarm circuit and fourth DC amplifier;

a third alarm circuit which is supplied with output signals of said second alarm circuit and first DC amplifier;

a third optical branch device for branching an output signal of said second optical amplifier to provide a third main optical signal to a transfer line and a third branched signal;

a third photodiode for converting said third branched signal to an electric signal; and a fifth direct current (DC) amplifier supplied with a voltage signal having a level corresponding to an average radiant power of said third branched signal supplied to said third photodiode, and supplying a control signal to said second injection current supply circuit to stabilize an output level of said second optical amplifier;

wherein, gain of said first optical amplifier can be changed in accordance with output current of said first injection current supply circuit; said first injection current supply circuit being prohibited from supplying output current in accordance with an output signal of said third DC amplifier; said driving current supply circuit and said second injection current supply circuit being prohibited from supplying output current in accordance with an output signal of said AND circuit, gain of said second optical amplifier being controlled by an output signal of said fifth DC amplifier in order to stabilize said output level of said second optical amplifier; and abnormality being monitored in accordance with output signals of said first to third alarm circuits.

9. An optical regenerative-repeater system, comprising:

a first optical branch device for branching an input optical signal to provide a first main optical signal and a first branched signal;

a first optical amplifier for amplifying said first main optical signal;

a first injection current supply circuit for supplying a driving current to said first optical amplifier;

a second optical branch device for branching an optical signal supplied from said first optical amplifier through an optical isolator to provide a second main optical signal and a second branched signal;

an optical latch for latching said second main optical signal;

a first photodiode for converting said second branched signal to an electric signal;

a wide-band amplifier for amplifying an output signal of said first photodiode;

a differentiating circuit for detecting a level change point in an output signal of said wide-band amplifier;

a full-wave rectification circuit for generating a line spectrum from an output signal of said differentiating circuit;

a timing tank for generating a first timing signal in accordance with an output signal of said full-wave rectification circuit;

a narrow-band amplifier for amplifying an output signal of said timing tank;

a first peak detector for detecting a peak value of an output signal of said narrow-band amplifier;

a first direct current (DC) amplifier for amplifying an output signal of said first peak detector to a predetermined level, comparing said amplified signal with a first reference voltage, and generating an error message signal when said amplified signal is equal to said first reference voltage;

an AND circuit being supplied with an output signal of said first DC amplifier at one input terminal;

a driving current supply circuit for supplying a second timing signal to said optical latch in accordance with output signals of said narrow-band amplifier and said AND circuit;

a second optical amplifier for amplifying an output signal of said optical latch;

a second injection current supply circuit for supplying a driving current to said second optical amplifier;

a second peak detector for detecting a peak value of said output signal of said full-wave rectification circuit;

a second direct current (DC) amplifier for generating a control voltage to be supplied to said first injection current supply circuit in accordance with an output signal of said second peak detector;

a second photodiode which is supplied with said first branched signal;

a third direct current (DC) amplifier for comparing a voltage signal corresponding to an average radiant power of said first branched signal supplied to said second photodiode with a second reference voltage, and supplying an alarm signal to said AND circuit and first injection current supply circuit when they are equal;

a fourth direct current (DC) amplifier for comparing an output signal of said second peak detector with a third reference voltage, and generating an alarm signal when they are equal;

a first alarm circuit which is supplied with an output signal of said third DC amplifier;

a second alarm circuit which is supplied with output signals of said first alarm circuit and fourth DC amplifier;

a third alarm circuit which is supplied with output signals of said second alarm circuit and first DC amplifier;

a third optical branch device for branching an output signal of said second optical amplifier to provide a third main optical signal to a transfer line and a third branched signal;

a third photodiode for converting said third branched signal to an electric signal;

a fifth direct current (DC) amplifier supplied with a voltage signal having a level corresponding to an average radiant power of said third branched signal supplied to said third photodiode, and supplying a control signal to said second injection current supply circuit to stabilize an output level of said second optical amplifier;

a sixth direct current (DC) amplifier for comparing said voltage signal corresponding to said average radiant power of said third branched signal received by said third photodiode with a fourth reference voltage, and generating an alarm signal when they are equal; and a fourth alarm circuit which is supplied with an output signal of said sixth DC amplifier;

wherein, gain of said first optical amplifier can be changed in accordance with output current of said first injection current supply circuit; said first injection current supply circuit being prohibited from supplying output current in accordance with an output signal of said third DC amplifier; said driving current supply circuit being prohibited from supplying output current in accordance with an output signal of said AND circuit, said second injection current supply circuit being prohibited from supplying output current in accordance with output signals of said AND circuit and said sixth DC amplifier, gain of said second optical amplifier being controlled by an output signal of said fifth DC amplifier in order to stabilize said output level of said second optical amplifier; and abnormality being monitored in accordance with output signals of said first to fourth alarm circuits.

10. An optical regenerative-repeater system, comprising:

a first optical amplifier for amplifying an input optical signal;

a first injection current supply circuit for supplying a driving current to said first optical amplifier;

an optical branch device for branching a signal supplied from said first optical amplifier through an optical isolator to provide a main optical signal and a branched signal;

an optical latch for latching said main optical signal;

a photodiode for converting said branched signal to an electric signal;

a wide-band amplifier for amplifying an output signal of said photodiode;

a differentiating circuit for detecting a level change point in an output signal of said wide-band amplifier;

a full-wave rectification circuit for generating a line spectrum from an output signal of said differentiating circuit;

a timing tank for generating a first timing signal in accordance with an output signal of said full-wave rectification circuit;

a narrow-band amplifier for amplifying an output signal of said timing tank;

a driving current supply circuit for supplying a second timing signal to said optical latch in accordance with an output signal of said narrow-band amplifier;

a peak detector for detecting a peak value of said output signal of said full-wave rectification circuit;

a direct current (DC) amplifier for generating a control voltage to be supplied to said first injection current supply circuit in accordance with an output signal of said peak detector;

a second optical amplifier for amplifying an output signal of said optical latch; and a second injection current supply circuit for supplying a driving current to said second optical amplifier;

wherein, gain of said first optical amplifier can be changed in accordance with output current of said first injection current supply circuit.

* * * * *